US007753091B2

(12) United States Patent
Ozanne et al.

(10) Patent No.: US 7,753,091 B2
(45) Date of Patent: *Jul. 13, 2010

(54) DEVICE AND METHOD FOR CONTROLLING THE FILLING OF A CUP BY A VENDING MACHINE

(75) Inventors: Matthieu Ozanne, Chessel (CH); Alexandre Kollep, Lutry (CH); Ralph Piguet, La Sarraz (CH); Grégoire Terrien, Ecublens (CH); Xavier Greppin, Ecublens (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,320

(22) Filed: Mar. 5, 2009

(65) Prior Publication Data

US 2009/0173409 A1   Jul. 9, 2009

Related U.S. Application Data

(63) Continuation of application No. 11/760,994, filed on Jun. 11, 2007, now Pat. No. 7,546,854, which is a continuation of application No. PCT/EP2005/012217, filed on Nov. 15, 2005.

(30) Foreign Application Priority Data

Dec. 14, 2004   (EP)   ................................. 04029524

(51) Int. Cl.
*B67C 3/00*   (2006.01)
(52) U.S. Cl. ........................... 141/198; 141/2; 141/83; 141/95; 367/107; 367/908
(58) Field of Classification Search ............... 141/2, 141/83, 94, 95, 192, 198; 367/107, 111, 367/908; 73/290 V
See application file for complete search history.

(56) References Cited

U.S. PATENT DOCUMENTS

| 3,916,963 | A |   | 11/1975 | McIntosh | 141/198 |
|---|---|---|---|---|---|
| 4,236,553 | A |   | 12/1980 | Reichenberger | 141/198 |
| 4,261,397 | A |   | 4/1981 | Guy | 141/1 |
| 4,446,896 | A |   | 5/1984 | Campagna | 141/198 |
| 4,458,735 | A | * | 7/1984 | Houman | 141/95 |
| 4,733,381 | A |   | 3/1988 | Farmer et al. | 367/93 |
| 4,917,155 | A | * | 4/1990 | Koblasz et al. | 141/1 |
| 5,036,892 | A |   | 8/1991 | Stembridge et al. | 141/1 |
| 5,335,705 | A |   | 8/1994 | Morishita et al. | 141/275 |
| 5,491,333 | A |   | 2/1996 | Skell et al. | 250/222.1 |
| 6,046,447 | A |   | 4/2000 | Skell et al. | 250/222.1 |
| 6,082,419 | A | * | 7/2000 | Skell et al. | 141/198 |
| 6,789,585 | B1 |   | 9/2004 | Janke | 141/198 |
| 7,546,854 | B2 | * | 6/2009 | Ozanne et al. | 141/198 |
| 2003/0010280 | A1 |   | 1/2003 | Sugihara et al. | 117/97 |

FOREIGN PATENT DOCUMENTS

| DE | 44 29 353 A1 | 2/1996 |
|---|---|---|
| JP | 5-275332 A | 10/1993 |
| WO | WO 97/25634 A1 | 7/1997 |

* cited by examiner

*Primary Examiner*—Timothy L Maust
(74) *Attorney, Agent, or Firm*—Winston & Strawn LLP

(57) ABSTRACT

A device for controlling the filling of a receptacle with liquid by a drink vending machine. The device includes visual marking device for marking the liquid fill level in the receptacle, a device for emitting a signal towards the receptacle, a device for receiving an incident signal and which receives the incident signal returning from the receptacle and a controlling device configured for commanding the stoppage of filling on the basis of a variation of the incident signal. The receiving device includes a series of photoelectric receivers and at least one variable which is a displacement of a light incident signal measured by the receivers.

24 Claims, 7 Drawing Sheets

DEVICE AND METHOD FOR CONTROLLING THE FILLING OF A CUP BY A VENDING MACHINE

CROSS-REFERENCE TO RELATED APPLICATIONS

This application is a continuation of application Ser. No. 11/760,994 filed Jun. 11, 2007 now U.S. Pat. No. 7,546,854 which is a continuation of International application PCT/EP2005/012217 filed Nov. 15, 2005, the entire content of which is expressly incorporated herein by reference thereto.

BACKGROUND

The field of the invention pertains to drink vending machines such as coffee machines or similar apparatus.

Certain drink vending machines use capsules containing ingredients to be extracted or to be dissolved; for other machines, the ingredients are stored and dosed automatically in the machine or else are added at the time of preparation of the drink. Most coffee machines also possess filling means comprising a pump for liquid, usually water, which pumps the liquid from a source of water that is cold or indeed heated through heating means, such as a heating resistor, a thermoblock or the like.

The fill of a drink in the receptacle, such as a cup or glass, is usually controlled in several different ways. In certain modes, the control of fill may be done by storing several fill programs in a controller which itself commands the time of activation of the pump and deactivates the pump via a relay. A drawback stems from the fact that depending on the state of the machine, for example the degree of limescale, the volumes actually delivered may vary significantly. As a consequence, the fill control is customarily done using a flow meter and by a control unit which counts down the number of pulses recorded on the flow meter positioned on the fluid supply circuit. However, a drawback is that it is necessary to provide a series of operating buttons depending on the number of different volumes to be delivered. For example, in a conventional coffee machine, a "ristretto" button is required for extra-short coffees (25 mL), an "espresso" button for short coffees (40 mL) and a "long" button for long coffees (110 mL). There is a real risk of confusion by the user unaccustomed to using the machine; this typically leads to the delivery of excessively strong coffees or to overspills from the cup. Another drawback arises from the lack of flexibility in respect of the user who may want an intermediate volume depending on the type of capsule or drink chosen. The flow meter may also lack accuracy or its accuracy be impaired on account of the scale which builds up on its surfaces. Another drawback arises from the fact that control by flow meter takes no account of the quantity of froth produced; this may lead to a spillover of froth for very frothy products.

Another mode consists in providing manual activation and deactivation of the pump by a button, a lever or some other operating means. Stated otherwise, the user alone is responsible for halting the flow of drink into the cup. However, this raises several drawbacks. One is that the user must remain attentive during the flow of the drink; without this, the system continues to deliver liquid: the risks of spillover are therefore fairly common. Another drawback arises from the fact that manual control such as this is inaccurate. The user may then encounter difficulties in reproducing the fill that he usually desires especially when the drink may produce more or less froth; this may fool the user in the control of the filling of the cup with liquid.

Another mode of control which is more complex and more expensive to implement consists of a means of recognition on a packaged portion of ingredients (for example, a capsule), such as a bar code, which transmits instructions to the machine, so as to tailor the volume to be delivered. In the same way, this system works on the activation of a pump using recorded programs and on the acquisition of data originating from a flow meter.

International patent application WO 97/25634 pertains to a method and a device for detecting the position of an object such as a container in a target window using the concept of triangulation of radiant energy. Such a device uses a first pair and a second pair of emitters and receiver and uses a triangulation calculation to detect the presence of the container. Such a device is not suitable for detecting the level of a drink in a receptacle.

U.S. Pat. No. 4,458,735 pertains to a device for automatically controlling the delivery of a drink such as a "milkshake" into a container made of translucent paper or foam. The receptacle is positioned under a source of radiation which directs a light ray against the rim of the receptacle; which ray passes through the receptacle and is detected by a radiation detector situated on the opposite side of the receptacle. The signal received by the detector is compared with a signal value level and when the attenuated signal drops below the signal value level, delivery is halted. Such a device does not allow sufficient detection accuracy, in particular, for coffee receptacles, on account of the way in which the incident signal is detected and then compared. Moreover, this device is unsuitable for translucent receptacles. Finally, the device does not make it possible to choose one's fill position. Thus, there is a need for improved devices of this type.

SUMMARY OF THE INVENTION

The present invention now solves the drawbacks of drink vending machines, in particular, coffee machines, by providing a device for controlling the fill of receptacles, which is simple to use, reliable, which simplifies the operation of the machine by the user and which adapts itself to all the capacities of the receptacles used. The invention applies also more particularly to products which produce froth by controlling the fill of the product including the layer of froth generated.

The invention generally relates to a device and method for controlling the filling of a receptacle with liquid in a drink vending machine. The device comprises means for filling the receptacle with liquid; means for visually marking a desired liquid fill level for the receptacle; means for emitting a signal towards the receptacle to generate an incident signal; means for receiving the incident signal coming from the receptacle; and means for controlling the filling means to cease filling. The controlling means is configured for processing of the incident signal by measuring at least one variable which is representative of the desired fill level and then stopping the filling means from further delivery of liquid when the measured variable reaches or exceeds a certain predefined threshold. Advantageously, the controlling means includes a microprocessor.

The visual marking means is preferably a light-emitting device or mechanical device. The visual marking means can mark a location on the internal wall of the receptacle and can produce a marking in the form of a light spot on the internal wall of the receptacle. Alternatively, the visual marking means can provide an indication of level outside the receptacle.

The signal emitting means and signal receiving means generally are light signals with the incident signal measured by the controlling means. The signal emitting means and signal receiving means may instead be based on ultrasound signals. The receiving means may be a series of photoelectric receivers with at least one variable is a displacement of a light incident signal measured by the receivers. In this device, the visual marking, emitter and receiver means are displaceable en masse so as to make it possible to modify the marking of the level of fill in the receptacle. Typically, these means are displaceable through an angular arc in a manual or automated manner.

The invention also relates to a method for controlling filling of a receptacle with liquid from a drink vending machine which comprises visually marking a desired liquid fill level a desired liquid fill level for the receptacle; emitting a signal towards the receptacle to generate an incident signal; receiving the incident signal coming from the receptacle; monitoring of a variable relating to the incident signal and representative of an actual liquid level in the receptacle; and stopping the filling of the receptacle when the variable reaches or exceeds a predetermined threshold.

In this method, the visual marking is done by pointing a light ray at the location of the desired level in the receptacle; the emitting of the signal is the emission of a light ray which generates an incident ray; the receiving of the signal is the reception of the incident ray at a nonzero angle; the monitoring of the at least one variable is done by measuring displacement of the incident ray by a camera; and the stopping occurs when the variable relating to the position of the incident ray reaches a certain predetermined threshold variation.

BRIEF DESCRIPTION OF THE DRAWING FIGURES

The invention will be better understood and further characteristics will emerge from the appended figures in which.

DETAILED DESCRIPTION OF THE PREFERRED EMBODIMENTS

Figure 1:
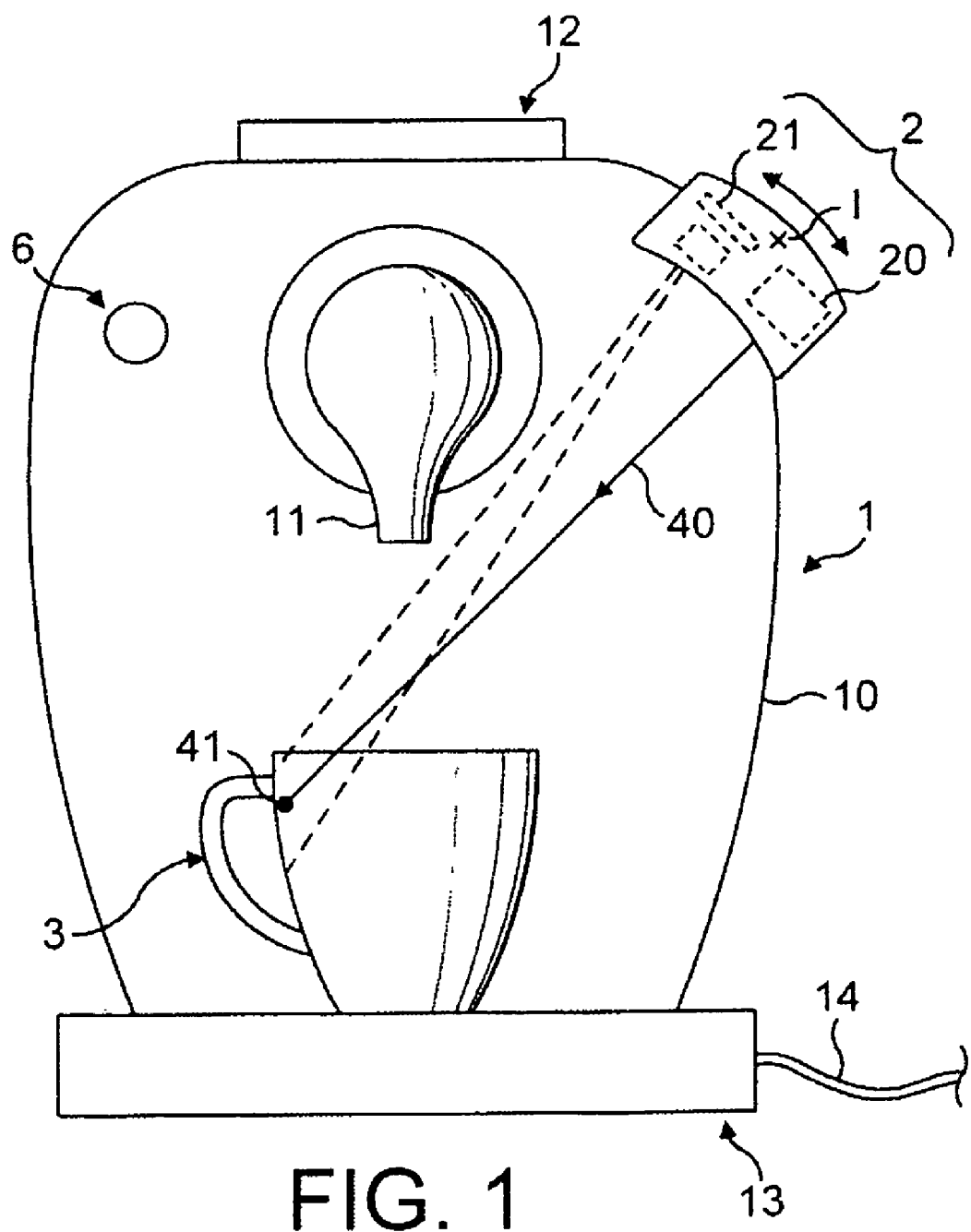
FIG. 1 represents a coffee machine furnished with a device for controlling the filling of a cup according to a preferred mode of the invention.

The invention relates to a device for controlling the filling of a receptacle with liquid by a drink vending machine, comprising means for filling the receptacle with liquid; a means of control acting so as to command the stoppage of the filling means. It also comprises a visual marking means for marking the liquid fill level in the receptacle, a means emitting a signal towards the receptacle; a means receiving an incident signal which receives the incident signal returning from the receptacle. The means of control may be configured so as to process the incident signal by measuring on the basis of this signal at least one variable representative of the level of fill in the receptacle, and command the stoppage of the means of filling when the variable reaches or exceeds a certain predefined threshold.

Within the context of the invention, the term "exceeds" signifies an upward or downward variation depending on the variable being monitored.

According to one embodiment, this variable may be a displacement of the incident ray measured by a series of photoelectric receivers. It turns out that control of the displacement is especially accurate and in particular less subject to variations in outside factors such as steam, colour of the receptacle, nature of the drink (liquid/froth), etc.

Several variables may also be taken in combination so as to improve the accuracy of detection. For example, the detection may be at one and the same time related to a displacement of the incident ray and related to the intensity of this ray. In particular, a variation of intensity of the incident signal may be detected on several photoelectric receivers disposed, for example, in at least one row. Thus, a combined variation of both the displacement detectable by several photoelectric receivers and the intensity of the signal on at least one of the photoelectric receivers makes it possible to guarantee better accuracy of detection and hence response of command of stoppage of the filling means.

Preferably, the receiver means is placed in such a way as to receive the incident ray coming from the inside of the receptacle. Thus, the detection may be done in an accurate manner regardless of the nature of the receptacle, in particular, even for nontranslucent receptacles.

Within the context of the invention, variation of intensity is understood as a variation of the light intensity itself or of an electrical or image (e.g. pixel) or photonic signal representing or recording a modification of this light intensity.

Thus, the device according to the invention affords a visual marking of the level of fill desired by the user as a function of the receptacle that the latter wishes to use. The user can therefore undertake a visual examination of the chosen level of fill and if necessary modify the level of fill if he does not find it suitable. Once the level marking has been carried out, the stoppage of filling is also done automatically without the user having to worry about effecting this stoppage himself. The stoppage of filling is thus not tied to a pre-programmed time or to a countdown of pulses originating from a flow meter, but is a function of at least one variable representative of the level of fill of the liquid. Stated otherwise, the accuracy of filling is ensured during each cycle.

Preferably, the means of visual marking is displaceable in such a way as to vary the position of the signal as a function of the level of fill desired. Preferably, the marking, emission and reception means are displaceable together as a whole so as to guarantee the maintaining of the emission and reception conditions regardless of the position of the marking.

The means of visual marking may be embodied by a light-emitting such as a light ray pointing into the receptacle and produced by a photoemitter module. The advantage of such a system is that it is compact and affords high accuracy of marking in particular when the photoemitter module produces a significant light intensity and comprises a means of focusing the light ray. A preferred means comprises an intense light source of the laser type. The advantage of a photoemitter module is also related to its use, combined with that of marking, as a signal emission means. Thus, the photoemitter module is associated with a photoreceiver module which receives the incident signal resulting from the reflection of the signal emitted against the marked wall of the receptacle and/or of the surface of the liquid as the liquid rises in the receptacle.

Thus, the signal emitting means is a photoemitter module for generating a light ray of light visible to the naked eye. The means of visual marking is a light spot in the receptacle from the light ray generated by the photoemitter module. The spot is positioned so as to mark the desired level of the drink in the receptacle. The receiving means is a photoreceiver module configured so as to sense the incident ray returning from the receptacle. The means of control are configured so as to measure a variation in the intensity and/or in the position of the incident ray received by the photoreceiver module. The means of control are also configured to command the stoppage of the filling means when the intensity and/or the position of the signal of the incident ray has reached a threshold of variation of the predetermined intensity and/or position. The advantage of such a system is that it is especially accurate, in particular, when the variable determined relates to the variation of the position of the incident signal.

Specifically, when the liquid or froth reaches the light spot, the latter moves to the surface of the liquid or froth; the displacement produces, as a consequence, a variation in the angle of the incident ray returning to the reception module. Even a tiny variation may be detected by the means of control and result in the stoppage of the filling means.

According to a preferred mode, the photoreceiver module comprises a camera with at least one row of photodiodes; the row being oriented so as to receive the incident ray in such a way that a variation in the position of the ray is detected on the row by one or more photodiodes. The advantage of a camera is essentially related to the ability to read a variation not necessarily related only to the intensity of the ray but also to the position of the incident ray. Specifically, the intensity of the light ray may be affected by the filling conditions related to various external factors such as the colour of the receptacle, the ambient steam around the receptacle, the exterior brightness, and the like, that may cause malfunctions of the device. The variation in the position of the incident ray is for its part less subject to changes of filling conditions related to these external factors. The advantage of a camera with discrete photosensitive elements arises from the accuracy of measurement which is dependent on the number of photodiodes or pixels produced. Thus, an accuracy of up to a pixel—up to half a pixel by a means of interpolating a virtual pixel—is rendered possible; this allows stoppage of the filling means immediately when the ray's position as detected on the camera varies even by a small amount.

As regards the positioning thereof, the row of photodiodes is preferably oriented in the same plane as the light ray generated by the photoemitter and at a non zero angle with respect to the ray. Such an orientation makes it possible to use a camera with a single row of photodiodes by ensuring a displacement of the incident ray along this row alone. Of course, a relative position of the transmission and reception modules, other than coplanar, would require the use of a camera with several rows of photodiodes; this is also possible but under more complex signal processing.

The camera is preferably associated with an optic placed in front thereof so as to make it possible to focus the angle of the camera closer to the region of the light spot. In a more particular mode, the camera also possesses its own means of control, of measurement and processing of the signal allowing it to produce a differential intensity distribution over the row of photodiodes (intensity distribution also referred to as a "differential image vector"). The variations related to this differential image vector can thereafter be detected by a control unit proper of the device.

According to a particular aspect of the invention, the device thus comprises means of control which are configured so as to:

determine the relative initial position of the incident ray on the row thus corresponding to the position of the initial light spot in the receptacle;

detect a variation in the position of the incident ray on the row corresponding to the change of position of the light spot produced by the rising of the liquid in the receptacle;

command the stoppage of the filling means as a function of the variation of the position according to a predetermined tolerance threshold.

In a more particular manner, the means of control undertake the measurements of the intensity of the incident ray on the photodiodes. These measurements make it possible to obtain a distribution of the intensity (the so-called "image vector") over the row of photo diodes which then makes it possible to determine the point of maximum intensity striking, for example, one particular photo diode in the row. The rise of the liquid produces a change of the distance from the light spot to the camera which translates into a modification of the incident ray by scattering over the row of photodiodes and hence a modification of the intensity distribution or image vector. This modification of the image vector may correspond to several changes including, for example, a displacement of the point (or pixel) of maximum intensity over the row; for example, from one photodiode to another adjacent one.

Other more noticeable modifications may be measured and detected, making it possible to improve the accuracy of detection as compared with a modification of the profile of the image vector as, for example, the variation of a slope of the image vector and/or the variation of a sub-pixel interpolated over this slope. The determination of these variables may be done by the electronics of the photoreceiver module itself (the camera) and a modification relating to these variables may be monitored by the control unit. For example, a slope may be measured between a pixel situated above a mean value of intensity of the image vector and a pixel situated below the mean value of intensity of the image vector. This slope is recorded as a reference variable at the start of the cycle, then recalculated repeatedly by the photoreceiver module. When the slope varies on account of the modification of the position of the incident ray, this variation is detected by the control unit and when this variation reaches or exceeds a given threshold, the control unit acts on the means for stopping filling. Another possible variable may be the intensity value of a virtual sub-pixel interpolated over the slope between the two pixels on other side of the mean value of intensity of the image vector. Likewise, the photoreceiver module repeatedly determines the intensity value of this virtual sub-pixel; and a change of this value is monitored by the control unit. Of course, other variables related to the image vector could be considered by the person skilled in the art to be relevant for improving the accuracy and/or the reliability of detection.

Preferably, the means of control are configured so as to control the emission of the light ray from the photoemitter module which emits in pulsed signal mode so that the reception signal of the photoreceiver module can be processed by differential measurement consisting in determining the position of the incident ray by differencing between an image vector produced by the photoreceiver module during the emission of the light signal and an image vector produced by the photoreceiver module between two emissions of the light signal by the photoemitter module.

Stated otherwise, the device operates according to a mode of differential measurements so as to eliminate the noise levels that may result from modifications of the exterior conditions such as variations in ambient light, the colours and patterns on the receptacle or other possible disturbing factors. In the differential mode of measurement, the control unit takes the difference between two intensity variations (or image vectors), one in the presence of the light ray, the other upon the extinction of the light ray; this difference leading to the elimination of the part of the intensity or "noise" that is unrelated to the light signal itself. This results in better accuracy and better reliability, regardless of the outside conditions, of the device.

The device according to the invention also comprises an operating member which at the start of each filling cycle commands at least;

the activation of the means of filling the receptacle with liquid;

the initialisation of the process of control by the control unit of the fill in the receptacle.

In order to allow adjustment by the user of the level of fill in the receptacle, the photoemitter module is configured so as to be able to be displaced so as to modify the position of the light spot as a function of the chosen fill level.

Preferably, the photoemitter and photoreceiver modules are jointly displaceable through a certain angular sector. They may be displaced manually or by assisted means such as by an electric motor.

Of course, in an alternative, the means of emission and of reception of the signal may be fixed and the position of the receptacle variable so as to allow the user to visually mark the level according to his requirements. To do this, provision may be made for the device to possess a moveable means of displacement of the receptacle making it possible to displace the receptacle as a function of the level desired in the receptacle.

In a possible alternative, the means of visual marking may be mechanical. It may, for example, be a displaceable mechanical pointer that can be slid along a rule; the pointer giving an indication of level outside the receptacle as the level of the liquid desired.

In the case of a means of marking of the mechanical type, the means of transmission and reception of the signal are preferably ultrasound in nature.

In this case, the device preferably comprises:

a signal emitter means which is a generator of ultrasonic waves directed towards the liquid surface in the receptacle;

the signal receiver means which is a receiver of the waves reflected by the surface of the liquid;

the means of visual marking representative of the desired level, establishes a threshold of theoretical distance between the surface of the liquid and the wave receiver, the means of control measure the actual distance between the liquid and the receiver during filling and commands the stoppage of the filling means when the actual distance reaches or exceeds the threshold of theoretical distance corresponding to the position of the level marked by the marking means.

The invention also pertains to a method for controlling the filling of a receptacle during the dispensing of a drink by a drink vending machine, characterized in that it comprises:

the visual marking of the desired level of liquid in the receptacle;

the emission of a signal towards the receptacle;

the reception of an incident signal coming from the receptacle;

the monitoring of a variable relating to the incident signal and representative of the liquid level reached in the receptacle, and the command for the filling of the receptacle to be stopped when the variable reaches or exceeds a predetermined threshold.

In a preferred mode, the visual marking is done by pointing a light ray at the location of the desired level in the receptacle;

the emission of the signal is done by the emission of the light ray;

the reception of the signal is done by reception of the incident ray at a nonzero angle;

the monitoring of at least one variable is done by measuring the displacement of the incident ray by a camera;

the command to stop is given when the displacement of the ray reaches or exceeds a certain predetermined threshold of displacement of the incident ray.

In a more particular mode, the variable corresponds to a parameter relating to a differential intensity distribution produced by at least one row of photodiodes of the camera.

With reference to FIG. 1, a coffee machine is illustrated bearing the reference 1 and equipped with an optoelectronic device 2 for monitoring the filling of a cup, which device is mounted rotatably about the horizontal axis I so as to allow orientation of the device so that the mark is aimed as a function of the height of the cups presented on the machine. As known per se, an exemplary coffee machine on which the device is associated comprises a body 10 including the essential elements for producing a drink of the coffee type or the like. Among these elements are generally found a flow duct 11, an extraction module for extracting a quantity of ingredient(s) contained in an (internal) capsule, an (internal) liquid pump for supplying the extraction module with liquid under pressure, an (internal) water heater for supplying the pump with heated liquid, a mechanism 12 for inserting the capsule into the extraction module, a cup holder and liquid collecting tray 13, and an electric current supply 14.

The control device 2 makes it possible to detect the level of drink in the cup 3 after it has flowed from the duct 11 and makes it possible to halt the filling of the cup by the drink, for example, by stopping the capsule extraction procedure; generally by shutting down the liquid pump which supplies the extraction module.

The control device comprises a module 20 for emitting a light ray at high intensity and a module for receiving the incident light ray 21. The emission module is preferably placed below the reception module so as to ensure a better angle of return of the signal even for receptacles of large size. The emission module 20 produces a light ray 40 focused, as by a collimator 22, capable of directing the ray onto the internal surface of the cup as a spot 41 of small size, for example of the order of from 1 to 2 mm or more. The size of the spot is also dependent on the capacity of the material of the receptacle to reflect light. For example, a white porcelain receptacle tends to form a more diffuse light spot than a black-coloured cup.

A source of light intensity that is sufficient is preferably a laser or an emitter of light based on a lamp or some other optoelectronic component producing an emission of photons (for example an LED). The module also comprises a focusing means making it possible to reduce the light ray striking the receptacle to a relatively small spot. In the case of a laser, the laser is chosen to emit in a wavelength range that can be read by the reception module capable of detecting the incident ray 42 of the laser, in particular, in a visible light range of the order of 650 nm. A laser module that may be suitable for the device of the invention may be of the diode laser type with variable focal length marketed by Conrad Electronic under reference OLSH-703P.

The module for receiving the ray is preferably an electronic camera. It comprises a row 23 of photodiodes which is oriented in the same vertical plane as the emitted laser ray but angularly offset with respect to the emitted ray. Each photodiode is a semiconductor which produces an electric current when the incident light ray reaches it. The intensity of the current produced depends on the diffusion of the light ray over the row, the centre of the incident ray producing in principle on the photodiode hit a maximum intensity of current. The row of photodiodes 23 consists for example of at least 20, preferably at least 50, most preferably of 100 to 200 photodiodes, associated with an amplification circuit and a pixel data support function. The number, the spacing and the size of the pixels condition the accuracy of the camera and hence the accuracy of the tolerance on the detected movement of the incident ray. In general, the greater the number of pixels the better the resolution. The pixels are, for example, spaced around 80-85 microns apart from centre to centre. A camera that may be suitable for the device is marketed under the reference TSL 1401R and under the brand TAOS, Plano, Tex., USA.

The camera 21 must be associated with an optical lens 24 placed in front of the camera so as to focus the angle of the camera onto the region of the light spot. A filter may also advantageously be associated in such a way as to allow through rays at certain wavelengths and prevent the passage of rays at undesired wavelengths. For example, very hot liquids may produce radiations close to infrared, hence invisible to the naked eye, which it may be necessary to filter out in order to avoid saturation of the camera and/or measurement errors. A filter impermeable to infrared therefore eliminates these radiations and retains only those emitted by the light-emitting means.

Figure 2:
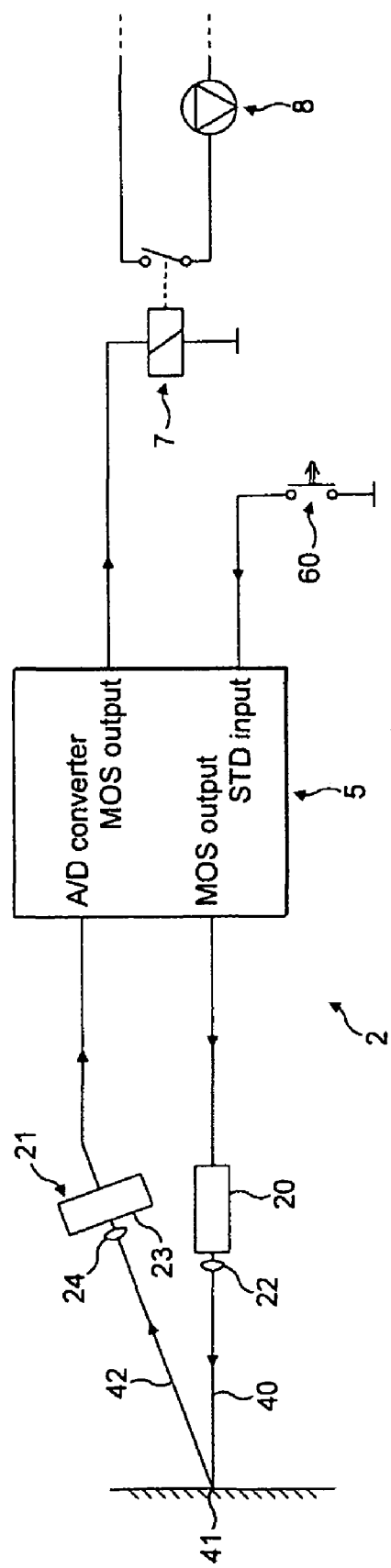
FIG. 2 shows a functional diagram of the device of FIG. 1.

As shown in FIG. 2, the device comprises a control unit 5, generally a microcontroller which as is known per se is customarily furnished with a microprocessor, input and output sections (I/O), a program memory and a memory for variable data.

The input of the microcontroller is coupled to an operating button 60 of the pushbutton type or equivalent for receiving an input signal for starting up the filling cycle. According to an advantage of the invention, a single operating button is sufficient for starting a cycle for different sizes of cups, for example, 25, 40 and 110 mL, and different types of drink. The microcontroller possesses an output of the MOS type to the laser emission module 20 for dispatching a signal in the form of a pulsed mode to the laser. The laser emission module thus produces light pulsations at a frequency of around 50 to 500 Hz. The pulsed mode is preferred since it makes it possible to improve the processing of the incident signal and to differentiate the useful parts of the signal from the parts disturbed by exterior conditions, for example, on account of the characteristics of the cups (colours, shapes, patterns), steam, ambient brightness, etc.

The reception module or camera 21 is connected to an input of the microcontroller 5. The signal produced by the camera is of the analogue type, since it involves values of light intensity, and is then converted into digital mode by an A/D converter integrated into the circuit of the microcontroller. The signal produces a distribution of the electric intensity over the photodiodes, in the form of a peak of intensity produced by the incident ray striking the row of photodiodes. This signal is analysed by the microcontroller which determines the photodiode(s) or pixels which produce the maximum electrical intensity. In pulsed laser mode, the processing unit of the microcontroller calculates, at the given frequency, in differential mode so as to be able to determine the maximum intensity by differencing two intensity measurements; one performed when the laser is on, the other when the laser is off.

On another output of the microcontroller, of the MOS type, a signal is dispatched to a relay 7 which commands the electrical activation of the filling means, namely, for example, a piston pump 8. It should be noted that the filling means may comprise various means such as liquid transport, bypass and/or stopping means. It may be a pump, gate(s), valve(s) or a combination of these means. The pump may be a piston pump, a diaphragm pump, a peristaltic pump or some other pump.

The way in which the device works will be described in conjunction with FIGS. 2 and 3. The user positions his cup in a stable manner in the service zone; that is to say, placed on the surface of the support 13 below the duct 11. When the laser is turned on, the user can orient the laser ray in such a way as to mark the internal edge of the cup corresponding to the level of fill that he desires. The orientation of the laser ray may be done in various ways. A preferred way is to orient modules 20, 21 jointly in rotation about the axis I so as to raise or lower the ray vertically in the cup according to the level desired. The marking is manifested as a small light spot of high intensity inside the cup. Once the marking has been carried out, a press on the operating button 60 allows a new filling cycle to commence. The microcontroller then dispatches an activation signal to the relay 7 which turns on the pump 8. The procedure for preparing (e.g., extracting or brewing) the drink can then commence.

Figure 3:
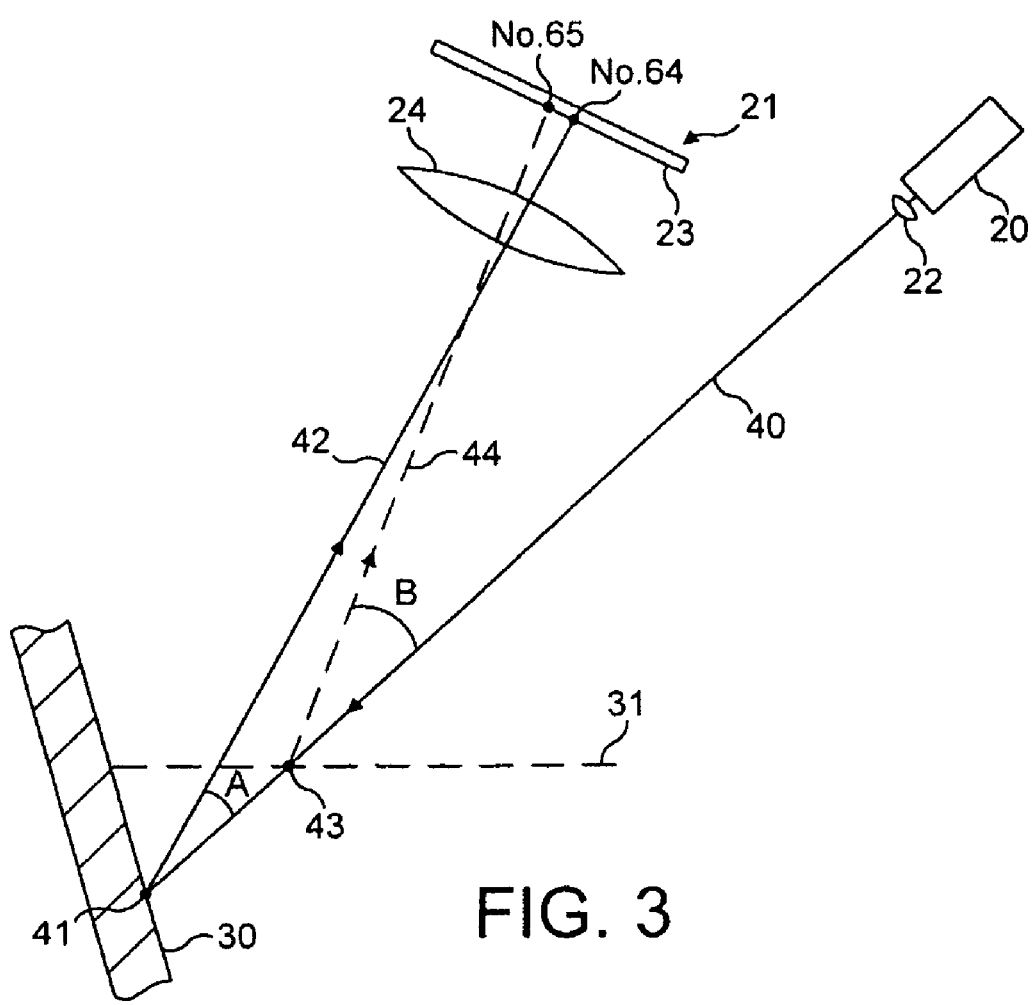
FIG. 3 shows a detailed view of the principle of operation of the device according to the invention between a position of marking without liquid or froth and a position with a liquid or froth surface.

As shown in FIG. 3, the ray emitted 40 produces a light spot on the internal surface 30 of the cup. The position of the light spot 41 on the internal surface 30 of the cup returns an incident ray 42 towards the reception module 21, in this instance, the linear camera. For example, the incident ray 42 and the emitted ray 40 make an angle A dependent on the geometry of the surface of reflection. The position of impact 41 of the incident ray 42 on the camera is then stored in the form of an image vector by the microcontroller. The microcontroller determines which of the photodiodes produces the maximum electrical intensity; for example, photodiode No. 64, of the row of photodiodes No. 1 to No. 128. When the fill is reached in the cup, the light spot moves upwards and towards the inside of the cup 43. The spot 43 reflected by the surface 31 of liquid and/or of froth produces a new incident ray 44 at an angle B different from A. When froth is produced, it is the upper surface of the froth which serves as reflecting surface. The new incident ray 44 is sensed by the linear camera 21; this is manifested as a change of the photodiode or of the group of photodiodes producing the maximum electrical energy intensity; which change corresponds to a change in the image vector. For example, the adjacent photodiode No. 65 now produces the maximum electrical intensity; which intensity is measured and associated with this pixel number. Since all the photodiodes are measured in one and the same time span, a distribution of the intensity is obtained in the form of an "image vector". When the tolerance on the position measurement exceeds a certain predetermined threshold, in this instance manifested as a change of one or more variables in the image vector, the microcontroller despatches a signal to open the relay; this deactivates the pump and halts the filling of the cup. The actual stopping of filling, that is the actual flow of the liquid into the cup, is dependent on various factors, namely, in particular, the tolerance determined by the microcontroller on the variable or variables of the image vector, and the volume of liquid finishing flowing into the capsule which contains the ingredients and into the flow duct. It may therefore be important to define the lowest possible tolerance so as to limit the difference between the moment at which the light spot is reflected by the surface of liquid or the froth and the moment at which no more liquid flows from the machine.

A preferred but non-limiting principle of detection and analysis of the signal will now be described in greater detail with reference to FIGS. 4 to 6.

Figure 4:
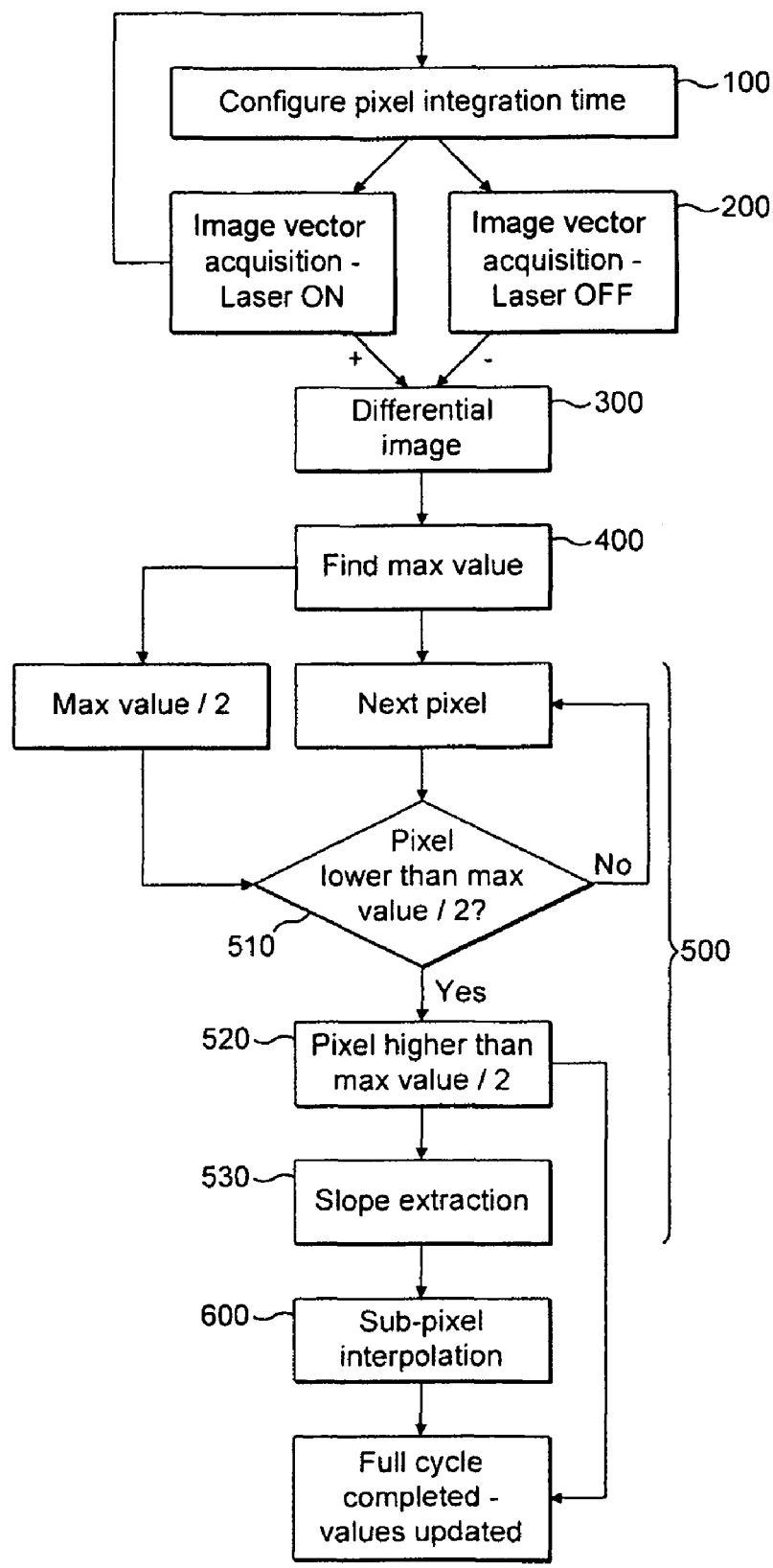
FIG. 4 shows the example of an algorithm for determining the variables of the incident ray processed by the photoreceiver module, in particular, by the camera.

FIG. 4 shows a repetitive cycle of an algorithm for acquiring the image vectors in differential mode and determining the relevant variables related to these image vectors. This cycle is customarily implemented independently by the system of the camera itself. Each sample image is captured consecutively with, then without the light beam. In a first step 100, the integration time, necessary for the charging of the capacitors of the pixels of the camera, is adjusted automatically as a function of the mean value of all the pixels, respectively of the maximum detected. This time during which the pixels are permitted to receive the light flux is chosen in such a way that no pixel is saturated. This integration value is independent of the frequency at which the result of the conversion is read. The frequency of flashing of the ray also depends on the value of the integration time.

Two successive images are used to extract the useful information. A second step 200 therefore consists in acquiring an image vector when the laser is in on mode and an image vector when the laser is in off mode. The image vector is more precisely a table of intensity values, corresponding to a distribution of the intensity produced by the row of pixels.

In the next step 300, the camera calculates the differential image vector corresponding to the difference between the two image vectors previously acquired. This is what yields the data necessary for detection.

Figure 6:
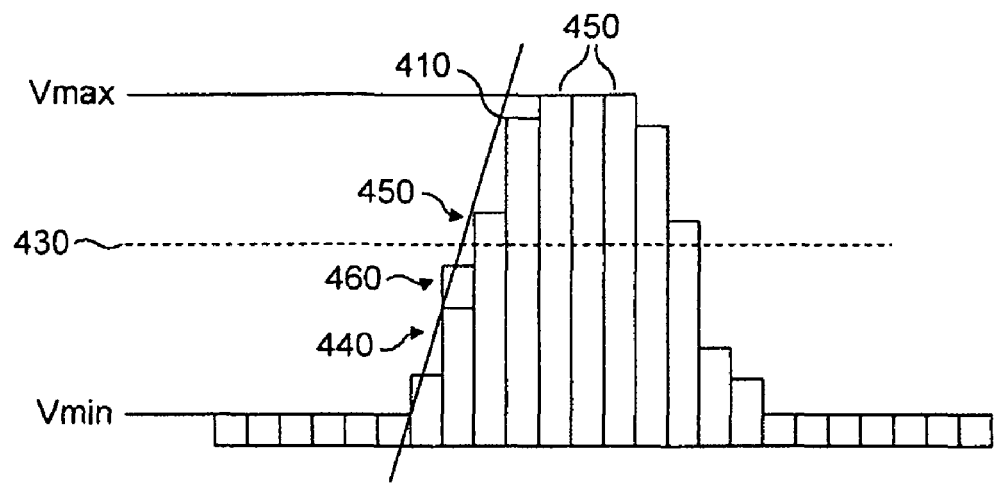
FIG. 6 represents, as an example, the differential value of the distribution of the intensity produced over a group of photodiodes corresponding to the light spot of the device of the invention ("differential image vector")

An exemplary differential image vector is illustrated in FIG. 6. Several intensity values are then determined from this vector. The first value determined is the position of the maximum intensity (or peak) 450 expressed as pixel numbers and determined in step 400. The latter corresponds to the centre of the reflected light spot which corresponds to one or more pixels. Next, in the following step 500 we determine a second value which is a quality factor expressed in the form of a slope 410. To do this, the camera searches for the pixel 440 below the mean value during a test 510. This mean is simply calculated by (max value-min value)/2. Once this pixel 440 has been detected, the camera determines the first pixel 450 situated above the mean value 430 in step 520. The slope 410 is then extracted by the camera in step 530 as being the junction line between the edges of the pixels 440 and 450 situated on either side of the line of mean value. Thereafter, a virtual pixel (or sub-pixel) 460 is interpolated in step 600 with the aid of this slope. This virtual intermediate pixel is also used in the level detection calculations; this makes it possible to improve the accuracy of detection while retaining the same resolution. The cycle of determining the differential image vector and the relevant variables is updated and repeated in a loop by the camera.

Figure 5:
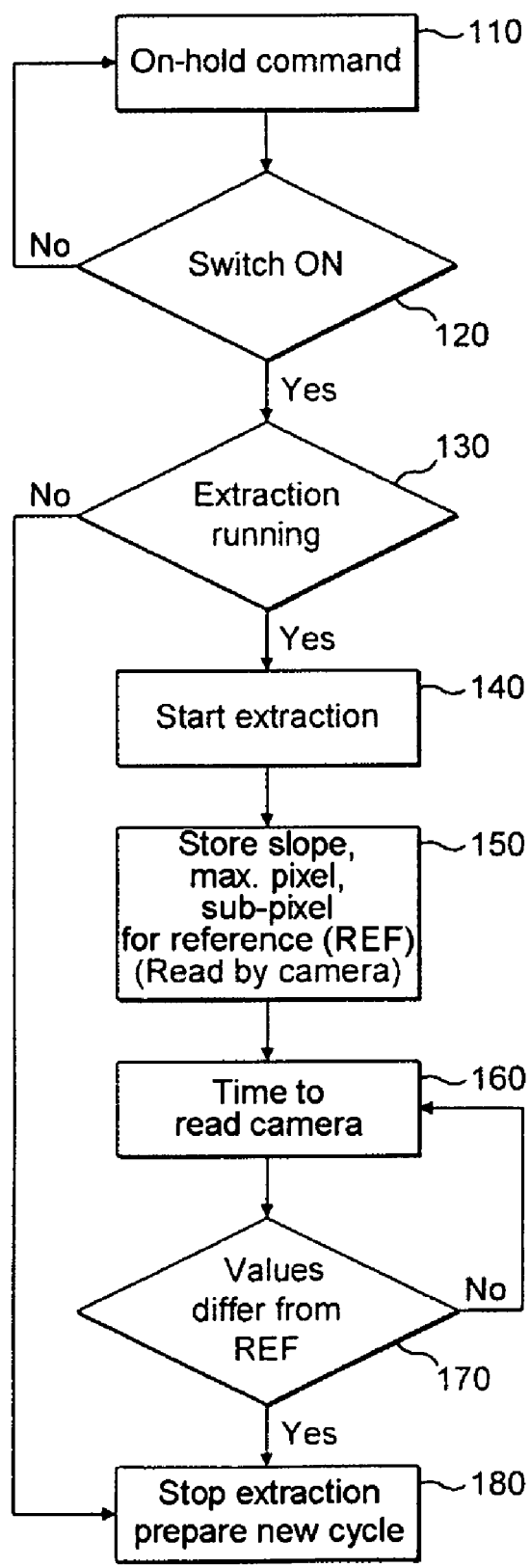
FIG. 5 shows the example of an algorithm for control by the control system of the device on the basis of the variables determined by the algorithm of FIG. 4.

FIG. 5 shows the control cycle conducted by the control unit 5 on the basis of the data and variables established during the cycle of FIG. 4 and transmitted by the camera to the control unit. The camera prepares the differential image vector permanently and the device is in standby mode (step 110). The button is then activated by the user (step 120) so as to commence the extraction cycle for a drink; stated otherwise, the pump 8 is activated and a test can confirm the starting or halt the extraction cycle in progress (steps 130-140). At the start of the detection procedure, the position of the pixels of maximum intensity, the sub-pixel and the slope are stored variables taken as reference (step 150). These variables are obtained in the cycle of data acquisition by the camera, as illustrated in FIG. 4. During extraction, at regular intervals (for example every 50 ms) the system performs a read of the information emanating from the camera (step 160) and performs tests of comparison with the references (step 170). The tests consist in calculating and supervising, for example, the position of the maximum, the alterations in the slope and the value of the sub-pixel. The control unit 5 then stops the extraction by acting on the relay 7 when the variation of one or more variables with respect to the references reaches or exceeds a predetermined threshold of tolerance (step 180).

It will therefore be understood that the accuracy is increased, for the same resolution, by controlling the variation of several parameters (position of the intensity maximum, sub-pixel and slope) related to the alterations in the intensity distribution produced by the incident ray striking the row of photodiodes.

It will be appreciated that the method of detection may be simplified and may consist merely in measuring and comparing just the values of maximum intensity without interpolation of a sub-pixel nor slope calculation; the detection of the fill level then being done only when the maximum intensity changes from one diode to another.

Figure 8:
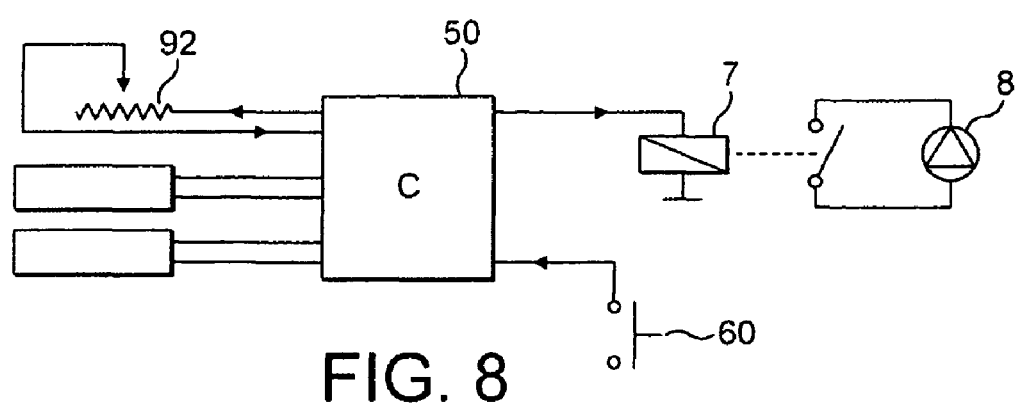
FIG. 8 shows a functional diagram of the device of FIG. 7.
Figure 7:
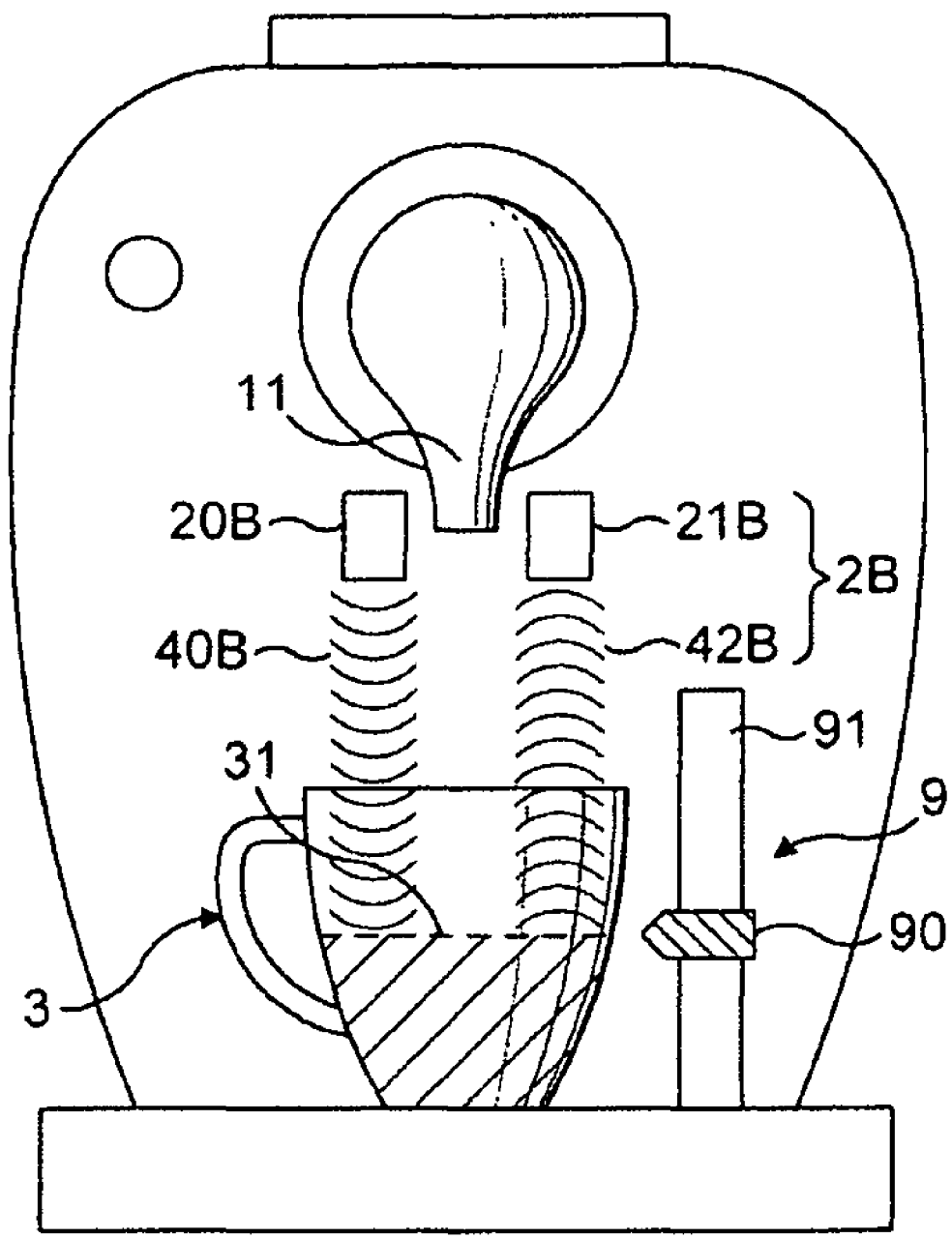
FIG. 7 represents in a diagrammatic view a coffee machine furnished with a control device according to a second embodiment.

FIGS. 7 and 8 illustrate a second possible mode of a device of the invention which works according to a principle of propagation of ultrasonic waves. The device 2B comprises an ultrasonic wave emitter 20B disposed vertically plumb with the zone of placement of the cup 3 so as to produce waves 40B heading towards the surface 31 of the liquid. An ultrasonic receiver 21B for receiving the reflected waves 42B coming from the surface of the liquid in the cup, is disposed vertically plumb with the zone of placement of the cup. The receiver is slightly offset horizontally with respect to the emitter, for example, on the opposite side with respect to the flow duct 11. A mechanical marking system 9 is provided on the side of the placement zone and as near as possible to the cup so as to allow the user to mark the desired level with the aid of a visual marking cursor 90 displaceable vertically with respect to a ruler scale 91.

In contradistinction to the previous mode, the marking is done externally. It is of course understood that the mechanical marking may also be replaced with a marker or light pointer of the laser type or the like; to mark the inside or the outside of the cup surface.

FIG. 8 shows the principle of operation in conjunction with a control unit 50. The cursor system 9 is associated with a variable resistor 92 which makes it possible to modify the voltage emitted by the controller which recovers a variable voltage measurement as a function of the position of the cursor on the ruler scale. By calibration, the voltage value corresponds to a predetermined theoretical distance between the surface of the liquid and the wave receiver. This theoretical distance itself corresponds to the visual level indicated by the visual marking cursor 90.

The wave emitter 20B is coupled with the control unit in output mode so as to receive a signal therefrom when the pushbutton 60 is activated. In input mode, the wave receiver informs the control unit of the alterations in the actual distance separating it from the liquid surface. When the liquid reaches or exceeds the level corresponding to theoretical distance value, the control unit outputs a signal for cutting the relay 7 so as to halt the supply to the pump 8.

The invention may comprise other variants and combinations within the scope of the person skilled in the art without thereby departing from the framework of the invention defined by the claims which follow.

What is claimed is:

1. A device for controlling filling of a receptacle with liquid in a drink vending machine comprising:
   means for filling the receptacle with liquid;
   means for visually marking a desired liquid fill level for the receptacle;
   means for emitting a signal towards the receptacle to generate an incident signal;
   means for receiving the incident signal coming from the receptacle, wherein the receiving means is a series of photoelectric receivers; and
   means for controlling the filling means to cease filling, the controlling means configured for processing of the incident signal by measuring at least one variable which is representative of the desired fill level and is a displacement of a light incident signal measured by the receivers; and then stopping the filling means from further delivery of liquid when the measured variable reaches or exceeds a certain predefined threshold.

2. The device according to claim 1, wherein the visual marking means of the level is a light-emitting device or mechanical device.

3. The device according to claim 2, wherein the visual marking means marks a location on the internal wall of the receptacle.

4. The device according to claim 3, wherein the visual marking means produces a marking in the form of a light spot on the internal wall of the receptacle.

5. The device according to claim 2, wherein the visual marking means provides an indication of level outside the receptacle.

6. The device according to claim 1, wherein the signal emitting means and signal receiving means are light signals and the incident signal is measured by the controlling means.

7. The device according to claim 1, wherein the signal emitting means and signal receiving means include further components that are based on ultrasound signals.

8. The device according to claim 1, wherein:
   the signal emitting means is a photoemitter module for generating a light ray of visible light ;
   the visual marking means is a light spot in the receptacle from the light ray generated by the photoemitter module; which spot is positioned so as to mark the desired fill level of the liquid in the receptacle;
   the receiving means is a photoreceiver module configured so as to sense the incident ray returning from the receptacle; and
   the controlling means is a microprocessor configured so as to measure a variation in the position of the incident ray received by the photoreceiver module and also to stop delivery of the liquid by the filling means when the position of the signal of the incident ray has reached a threshold of variation of the predetermined position.

9. The device according to claim 8, wherein the photoreceiver module comprises a camera having at least one row of photosensitive photodiodes; with the photodiode row being oriented so as to receive the incident ray in such a way that a variation in the position of the ray is detected on the row by the one or more photodiodes.

10. The device according to claim 9, wherein the camera orients the row of photodiodes in the same plane as the light ray generated by the photoemitter and at a nonzero angle with respect to the ray.

11. The device according to claim 8, wherein the photoemitter module is a laser or a light emitter based on a lamp or other optoelectronic component and comprises focusing means.

12. The device according to claim 8, wherein the microprocessor of the controlling means is configured to:
   determine the relative initial position of the incident ray corresponding to The position of the initial light spot in the receptacle;
   detect a variation in the position of the incident ray corresponding to the change of position of the light spot produced by the rising of the liquid in the receptacle;
   command the filling means to stop as a function of the variation of the position according to a predetermined tolerance threshold.

13. The device according to claim 8, wherein the microprocessor is configured to also detect a variation of intensity on the receiver module and operate the filling means as a function of a variation of the intensity measured.

14. The device according to claim 8, wherein the microprocessor detects the variation of position of the incident ray by measurement and then compares an image vector representing intensity distribution produced by the row of photodiodes, and detects a change of at least one variable relating to this image vector.

15. The device according to claim 14, wherein the microprocessor of the controlling means is further configured to control the emission of the light ray from the photoemitter module which emits in pulsed signal mode so that the reception signal of the photoreceiver module can be processed by differential measurement consisting in determining the position of the incident ray by differencing between an image vector produced by the photoreceiver module during the emission of the light signal and an image vector produced by the photoreceiver module between two emissions of the light signal by the photoemitter module.

16. The device according to claim 8, which further comprises an operating member which at the start of each filling cycle commands, at least:
   activation of the filling mean for filling the receptacle with liquid;
   initialization of the controlling means for filling by a control unit.

17. The device according to claim 8, wherein the photoemitter module is configured to be able to be displaceable so as to be able to modify the position of the light spot as a function of the chosen level of fill in the receptacle.

18. The device according to claim 17, wherein the photoemitter and photoreceiver modules are jointly displaceable through a certain angular sector.

19. The device according to claim 7, wherein:
   the signal emitter means is a generator of ultrasonic waves directed towards the liquid surface in the receptacle;
   the signal receiver means is a receiver of the waves reflected by the surface of the liquid;
   the visual marking means representative of the desired level establishes a threshold of theoretical distance between the surface of the liquid and the wave receiver;
   the controlling means measures the actual distance between the liquid and the receiver during filling and commands the stoppage of the filling means when the actual distance reaches or exceeds the threshold of theoretical distance corresponding to the position of the level marked by the marking means.

20. The device according to claim 1, wherein the visual marking, emitter and receiver means are displaceable en masse so as to make it possible to modify the marking of the level of fill in the receptacle.

21. A device for controlling filling of a receptacle with liquid in a drink vending machine comprising:
- means for filling the receptacle with liquid;
- means for visually marking a desired liquid fill level for the receptacle;
- means for emitting a signal towards the receptacle to generate an incident signal; and
- means for receiving the incident signal coming from the receptacle; wherein the visual marking, signal emitting and signal receiving means are displaceable together through an angular arc in order to modify the marking of the desired fill level of the receptacle.

22. The device according to claim 21, wherein the visual marking, emitter and receiver means are displaceable through the angular arc in a manual or automated manner, and wherein the receiving means is a series of photoelectric receivers.

23. A method for controlling filling of a receptacle with liquid from a drink vending machine which comprises:
- visually marking a desired liquid fill level a desired liquid fill level for the receptacle;
- emitting a light signal towards the receptacle to generate a light incident signal;
- receiving the incident signal coming from the receptacle by a series of photoelectric receivers with at least one variable measured by the receivers is a displacement of the light incident signal;
- monitoring of a variable relating to the light incident signal and representative of an actual liquid level in the receptacle; and
- stopping the filling of the receptacle when the variable reaches or exceeds a predetermined threshold.

24. The method according to claim 23, wherein:
- the visual marking is done by pointing a light ray at the location of the desired level in the receptacle;
- the emitting of the signal is the emission of a light ray which generates an incident ray;
- the receiving of the signal is the reception of the incident ray at a nonzero angle;
- the monitoring of the at least one variable is done by measuring displacement of the incident ray by a camera; and
- the stopping occurs when the variable relating to the position of the incident ray reaches a certain predetermined threshold variation.

* * * * *

UNITED STATES PATENT AND TRADEMARK OFFICE
CERTIFICATE OF CORRECTION

PATENT NO.        : 7,753,091 B2                                    Page 1 of 1
APPLICATION NO. : 12/398320
DATED             : July 13, 2010
INVENTOR(S)       : Ozanne et al.

It is certified that error appears in the above-identified patent and that said Letters Patent is hereby corrected as shown below:

Column 14:
Line 4 (claim 12) before "position" change "The" to -- the --.

Signed and Sealed this

Seventeenth Day of August, 2010

David J. Kappos
*Director of the United States Patent and Trademark Office*